(12) United States Patent  
Guering et al.

(10) Patent No.: US 11,155,337 B2  
(45) Date of Patent: Oct. 26, 2021

(54) MONOBLOC AND REMOVABLE PEDAL MODULE FOR AN AIRCRAFT RUDDER BAR

(71) Applicant: AIRBUS OPERATIONS S.A.S., Toulouse (FR)

(72) Inventors: Bernard Guering, Montrabe (FR); Laurent Saint-Marc, Montaigut sur Save (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 238 days.

(21) Appl. No.: 16/410,908

(22) Filed: May 13, 2019

(65) Prior Publication Data

US 2019/0359318 A1 Nov. 28, 2019

(30) Foreign Application Priority Data

May 22, 2018 (FR) ...................................... 1854224

(51) Int. Cl.  
*B64C 13/02* (2006.01)  
*B64C 13/04* (2006.01)  
*B64C 13/06* (2006.01)

(52) U.S. Cl.  
CPC ............ *B64C 13/044* (2018.01); *B64C 13/06* (2013.01)

(58) Field of Classification Search  
CPC ........ B64C 13/044; B64C 13/06; B64C 13/08  
See application file for complete search history.

(56) References Cited

U.S. PATENT DOCUMENTS

| 2008/0105790 | A1* | 5/2008 | Christensen | ............. G05G 5/03 244/235 |
| 2014/0131523 | A1* | 5/2014 | Carner | .................... B64C 13/06 244/235 |
| 2016/0348772 | A1* | 12/2016 | Petrou | ................... B64C 13/044 |
| 2017/0166296 | A1* | 6/2017 | Guering | ............... B64C 13/044 |
| 2017/0283037 | A1* | 10/2017 | Guering | ............... B64C 13/044 |

OTHER PUBLICATIONS

INPI, French Search Report for Application No. 1854224, dated Feb. 11, 2019.

* cited by examiner

*Primary Examiner* — Richard G Davis  
(74) *Attorney, Agent, or Firm* — Greer, Burns & Crain, Ltd.

(57) ABSTRACT

Disclosed herein is a monobloc and removable pedal module for an aircraft rudder bar. The pedal module, which is intended for a rudder bar, includes a pedal, at least one integrated adjustment system, and a connection device which enables a removable connection of the pedal module to be produced. The pedal module is a monobloc component in order to simplify and facilitate its replacement via the removable connection obtained by the connection device.

17 Claims, 5 Drawing Sheets

MONOBLOC AND REMOVABLE PEDAL MODULE FOR AN AIRCRAFT RUDDER BAR

CROSS-REFERENCE TO PRIORITY APPLICATION

This application claims the benefit of, and priority to, French patent application number 1854224, filed May 22, 2018. The content of the referenced application is incorporated by reference herein.

TECHNICAL FIELD

Embodiments of the subject matter described herein relate generally to a pedal module for a rudder bar of an aircraft, in particular for a transport airplane, and a rudder bar comprising at least one such pedal module.

BACKGROUND

On an aircraft, a rudder bar is a mechanical device which permits the pilot and/or copilot to control the rudder unit and the brakes of the wheels.

The rudder bar comprises pedals and an assembly of mobile components which, depending on the types of movement which are applied to the pedals by the pilot(s), control the rudder unit or the brakes of the aircraft.

The rudder bars used on aircraft are principally, on passenger airplanes, rudder bars which are integrated in the floor of the cockpit. The rudder bar is said to be placed since it rests on the floor of the cockpit.

For the operation thereof, and in particular for the implementation of the functions of the pedals connected with the steering control and the functions of the pedals connected with the braking system, the rudder bar must comprise a large number of components (articulations, connecting rods, pivots, etc.).

Such a conventional rudder bar, as a result in particular of this high number of components, is complex. This conventional rudder bar is not optimal in particular in terms of spatial requirement, mass and cost. Furthermore, this complexity, as a result in particular of numerous connections between components, makes interventions and maintenance operations on the pedals and the associated components difficult.

This conventional solution is therefore not completely satisfactory.

BRIEF SUMMARY

The present disclosure relates to a pedal module for an aircraft rudder bar, the pedal module comprising a pedal.

According to the disclosure, the pedal module is monobloc and it further comprises at least one integrated adjustment system, and a connection device which enables a removable connection of the pedal module to be produced.

In this manner, the functions of a pedal are integrated in a single module (referred to as the pedal module) which is monobloc. In the context of the present disclosure, a "monobloc module" is intended to be understood to be a module which is in a single piece or integral (that is to say, which comprises a single object).

Furthermore, the pedal module may be connected in a removable manner to the remainder of the rudder bar. A single pedal module is thus obtained per pedal and can be readily disconnected from the rudder bar. This enables the replacement of this pedal module to be simplified and facilitated and thus enables the above-mentioned disadvantage to be overcome.

In a preferred embodiment, the pedal module further comprises an integrated braking system. The pedal module thus integrates all the functions linked to the corresponding pedal.

Advantageously, the braking system comprises a position sensor which is configured to measure a rotation of the pedal during a braking action. Preferably, the position sensor is installed in a first housing which is arranged in a lower portion of the pedal.

Furthermore, advantageously, the adjustment system is capable of being controlled and it is configured to enable an inclination angle of the pedal to be adjusted. To this end, the adjustment system advantageously comprises a geared motor which is capable of being controlled.

In a specific embodiment, the adjustment system further comprises a screw which is capable of being rotated by the geared motor, the screw acting on a nut which is configured to tilt a bellcrank during a rotation of the screw, the bellcrank being provided with a roller which is arranged so as to be in contact with a roller track which is formed on the pedal and to push the pedal when the bellcrank is tilted in order to modify the inclination thereof.

Preferably, the geared motor is installed in a second housing which is arranged in a lower portion of the pedal.

Furthermore, in a specific embodiment, the pedal is provided with at least one access hatch which affords access to at least one of the first and second housings, the access hatch being arranged on a support face of the pedal which is intended to act as a support for a foot of a pilot.

In this specific embodiment, the pedal module preferably comprises at least one automatic extraction system which is configured to automatically extract an element (for example, the position sensor or the geared motor) which is installed in the (first or second) housing in the event of the opening of the access hatch of this housing.

Furthermore, the pedal module advantageously comprises a hollow monobloc carrier structure on which the pedal is rotatably mounted.

Furthermore, the pedal module advantageously comprises a protection bellows which is arranged between the pedal and the carrier structure.

The present disclosure also relates to a rudder bar which comprises at least one pedal module as specified above.

In a preferred embodiment, the rudder bar comprises at least one central module and two pedal modules of this type, the pedal modules being arranged at one side and the other of the central module, each of the pedal modules being arranged on an associated lateral face of the central module.

Furthermore, in a specific embodiment, the central module is provided, on each of these lateral faces, with guide rails which are configured to cooperate with recirculating ball bearing tracks which are fixed to the associated pedal module and which form part of the connection device.

Furthermore, advantageously, the central module is provided on each of the lateral faces with an arm, each of the arms being connected in an articulated manner to a push rod of the corresponding pedal module, the arm and the push rod being configured to ensure the transmission of a movement of the pedal of the pedal module.

The present disclosure also relates to an aircraft, in particular a transport airplane, which is provided with at least one pedal module and/or at least one rudder bar, as specified above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The appended Figures will provide a good understanding of how embodiments of the invention can be carried out. In these Figures, identical reference numerals refer to similar elements. More specifically.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
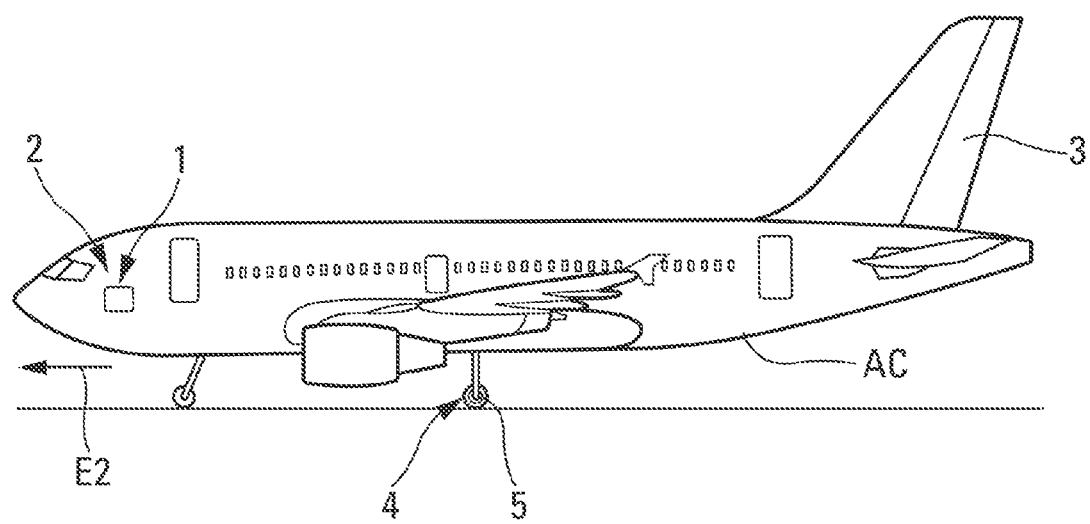
FIG. 1 is a lateral view of an aircraft on the ground which comprises a rudder bar according to an embodiment of the invention.

FIG. 1 shows an aircraft AC, in this instance a transport airplane, which comprises a cockpit 2 in which a rudder bar 1 is arranged (as illustrated very schematically in this FIG. 1). The aircraft AC also comprises a rudder unit 3 and brakes 4 in the region of the wheels 5 of a main landing gear of the aircraft AC.

Figure 2:
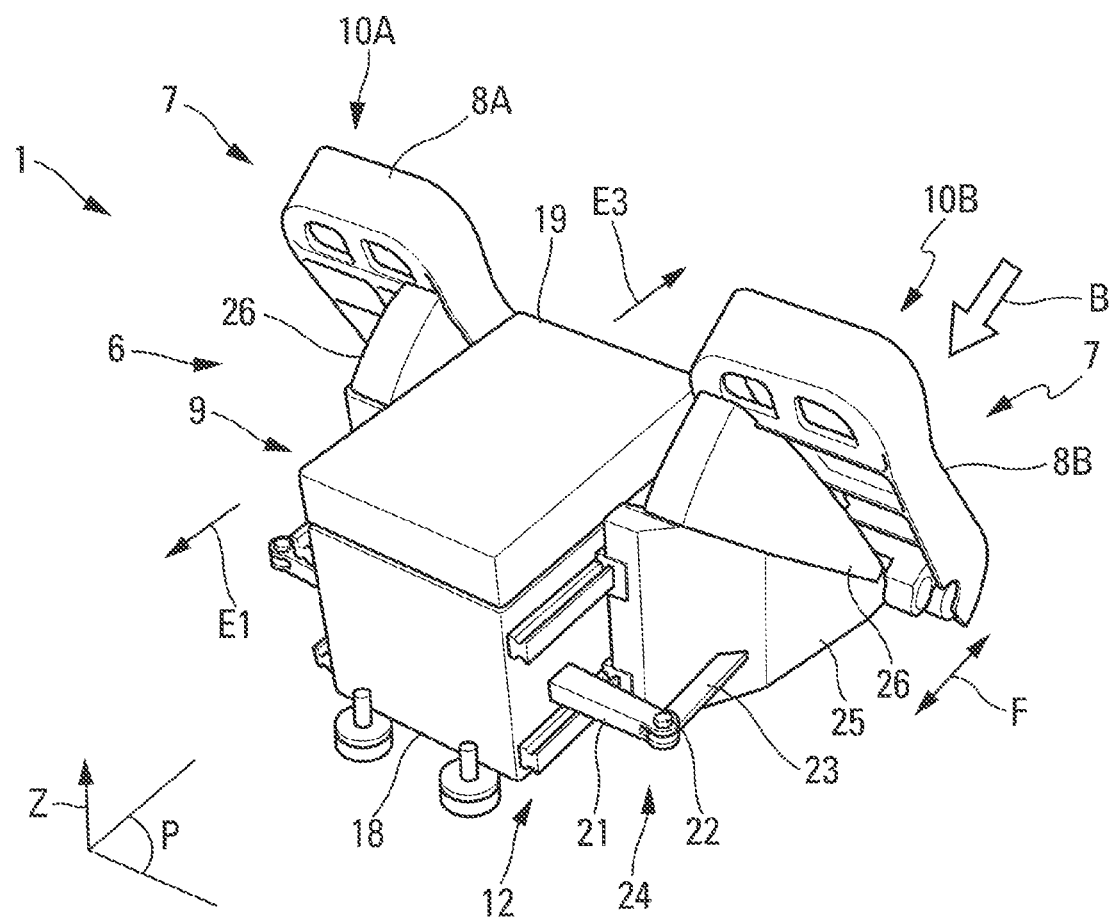
FIG. 2 is a perspective view of a rudder bar facing the front.

FIG. 2 shows a preferred embodiment of the rudder bar 1.

This rudder bar 1 is intended to be integrated in the floor (not illustrated) of the cockpit 2 of the aircraft AC.

In the context of the present disclosure, the directions "rear" and "front" are defined relative to the longitudinal direction of the aircraft AC, that is to say, for "front" (as illustrated in FIG. 2 by an arrow E1) toward the front of the aircraft AC (in the direction of an arrow E2 in FIG. 1) in the direction of flight (or movement) of the aircraft AC and for "rear" (as illustrated in FIG. 2 by an arrow E3) toward the rear of the aircraft AC in the direction counter to the direction of flight (or movement) of the aircraft AC.

Furthermore, in the context of the present description, the terms "lower", "upper", "low" and "high" are defined in a vertical direction Z which is orthogonal to a horizontal plane P (defined by a direction referred to as longitudinal and a direction referred to as lateral) of the aircraft, the plane P being parallel with the floor (not illustrated) of the cockpit, as illustrated in FIG. 2.

More specifically: the longitudinal direction is defined along the longitudinal axis of the aircraft; the vertical direction Z forms with the longitudinal direction a plane which is referred to as vertical and which is parallel with a vertical plane of symmetry of the aircraft; and the lateral direction is orthogonal to the longitudinal direction and vertical direction, the lateral direction forming with the longitudinal direction the plane P which is parallel with the floor of the cockpit 2.

In conventional manner, the rudder bar 1 of the aircraft AC is a control member which enables a pilot to control the rudder unit 3 (FIG. 1) so as to act on the yaw axis of the aircraft AC during a flight, and also to ensure the braking of the aircraft AC when it is moving on the ground, as set out below.

The rudder bar 1 which is intended for a conventional transport airplane, comprises an actuation assembly 6, illustrated in FIG. 2, which is capable of being actuated by a pilot, for example, the main pilot or a copilot of the aircraft. To this end, the rudder bar 1 comprises a pair of pedals. This pair 7 comprises two pedals 8A and 8B which are intended to be actuated by the two (left and right) feet of the pilot, respectively.

For an aircraft which is controlled by two pilots, the rudder bar 1 comprises two actuation assemblies 6 such as that of FIG. 2, for example, which are configured in conventional manner so that the pedals which are intended for one of the pilots, the copilot, for example, are always in the same position as those which are intended for the other pilot, the main pilot, for example.

Figure 3:
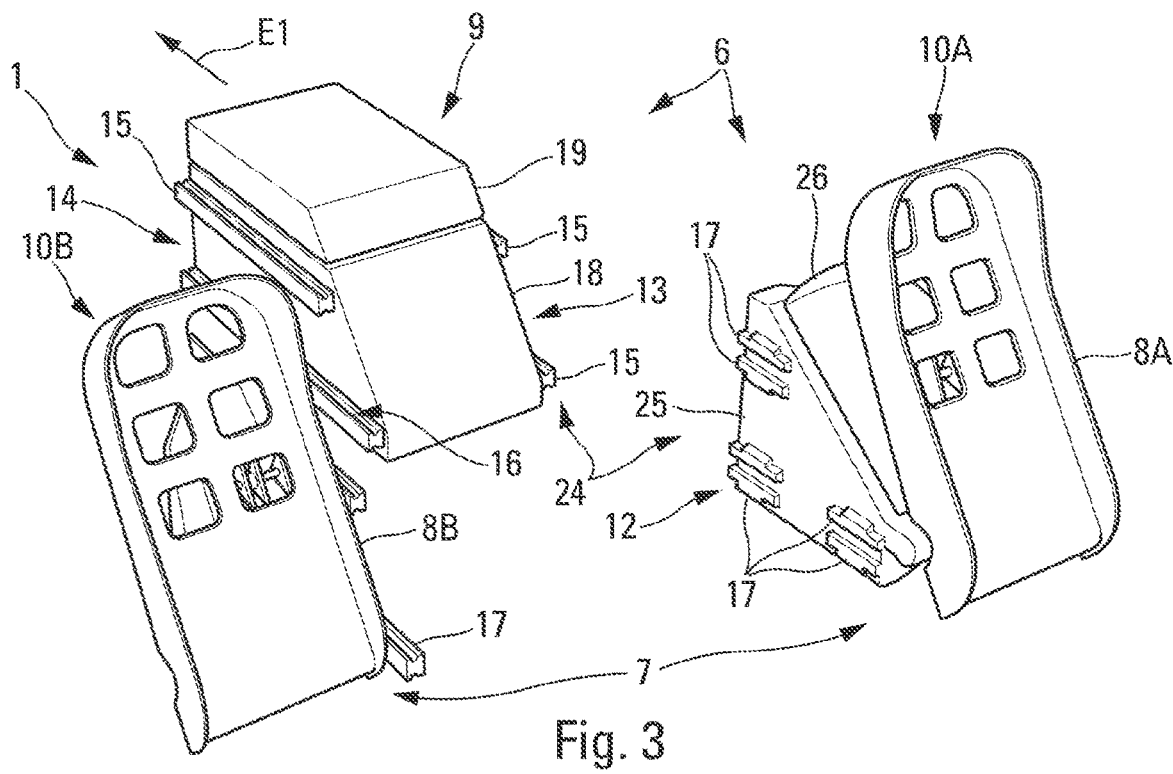
FIGS. 3 and 4 are perspective views, facing the rear and front, respectively, of a rudder bar whose pedal modules are separated by a central module.
Figure 4:
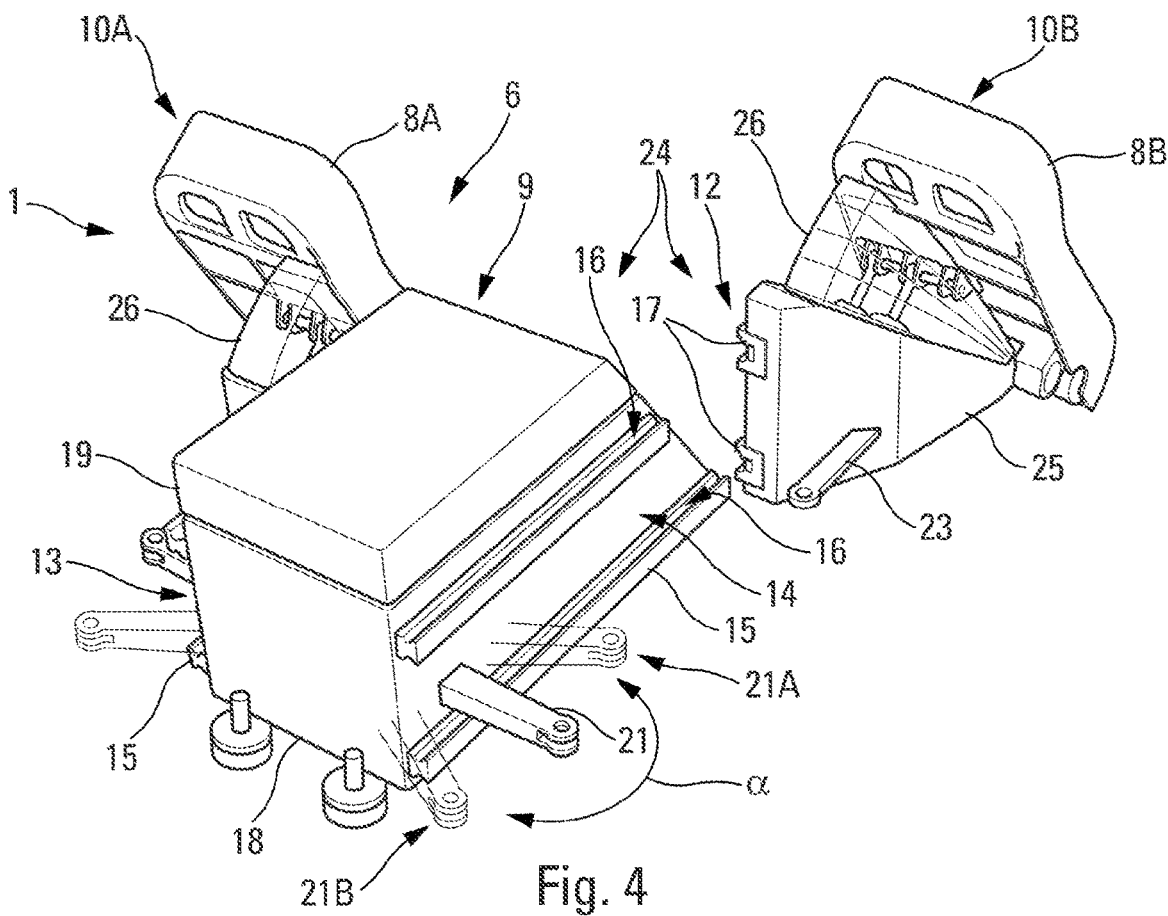

As illustrated in FIGS. 2 to 4 in particular, the rudder bar 1 comprises a central module 9 and two pedal modules 10A and 10B, each of which is provided with a single pedal 8A and 8B. The pedal modules 10A and 10B are arranged at one side and the other of the central module 9. The pedal module 10A (provided with the pedal 8A) is arranged on a lateral face 13 (FIG. 3) of the central module 9 and the pedal module 10B (provided with the pedal 8B) is arranged on a lateral face 14 of the central module 9.

According to the disclosure, each of the pedal modules 10A and 10B of the rudder bar 1 is monobloc, that is to say, it is produced in a single piece and it is unitary (corresponding to a single object).

Furthermore, each of the pedal modules 10A and 10B comprises, in addition to the associated pedal 8A, 8B, an integrated adjustment system 11 (FIGS. 9 to 12) set out below, and a connection device 12 which enables a removable fixing of the pedal module 10A, 10B relative to the central module 9 to be produced.

In this manner, as set out below, all of the functions of a pedal 8A, 8B are integrated in a single module (referred to as the pedal module 10A, 10B which is monobloc).

Furthermore, the pedal module 10A, 10B may be connected in a removable manner to the remainder of the rudder bar 1 and in particular to the central module 9. A single pedal module 10A, 10B is thus obtained per pedal 8A, 8B and may be easily disconnected from the rudder bar 1. This enables in particular the handling and the replacement of this pedal module 10A, 10B to be simplified and facilitated.

In a preferred embodiment, the central module 9 is provided, on each of the lateral faces 13 and 14, with two guide rails 15 (which are each provided with a rolling path 16), as illustrated in particular in FIGS. 3 and 4.

These guide rails 15 are arranged parallel with each other on each of the lateral faces 13 and 14, one at the bottom and the other at the top of the central module 9.

These guide rails 15 are configured to cooperate with recirculating ball bearing tracks 17. These tracks 17 are fixed to the associated pedal module 10A, 10B and are configured to be able to move in the rolling paths 16 of the guide rails 15. These tracks 17 form part of the connection device 12 of the pedal module 10A, 10B.

Figure 5:
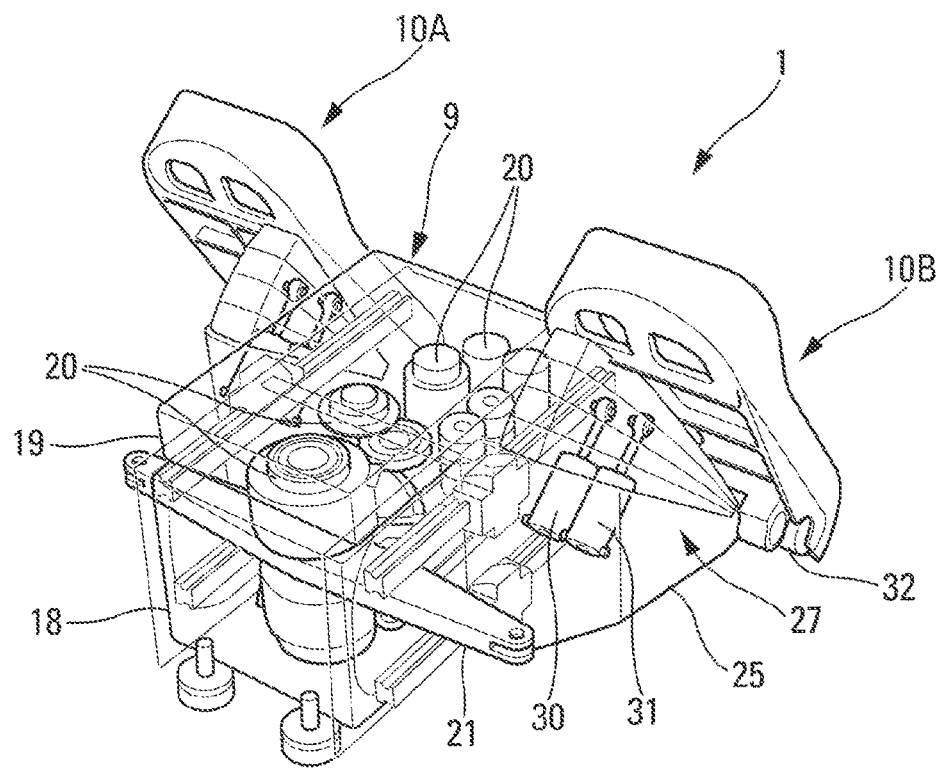
FIG. 5 is a Figure similar to FIG. 2 with walls illustrated transparently, in order to show elements arranged inside the rudder bar.

In a specific embodiment, illustrated in FIGS. 2 to 4, the central module 9 comprises a lower base module 18 and an upper auxiliary module 19. The auxiliary module 19 (or electric module) is arranged, preferably in a removable manner, on the base module 18. As illustrated in FIG. 5, which shows the base module 18 and the auxiliary module 19 of the central module 9 in a transparent manner, the central module 9 is provided with a plurality of components, in particular electronic components, which are intended for the operation of the rudder bar 1 and identified generally by reference numerals 20 in FIG. 5.

Furthermore, the central module 9 is provided, on each of the lateral faces 13 and 14, with an arm 21 as illustrated in FIGS. 2 and 4. Each of the arms 21 is connected, in an articulated manner via a screw 22 (FIG. 2), to a push rod 23 of the corresponding pedal module 10A, 10B. For each pedal module 10A, 10B, the arm 21 and the push rod 23 are configured to ensure the transmission of a movement of the pedal of the pedal module 10A, 10B (in the direction illustrated by an arrow F in FIG. 2), to the whole of the rudder bar 1.

As a result of the connection system 24 formed by the connection device 12 provided on each pedal module 10A, 10B and cooperating guide rails 15, each pedal module 10A, 10B can be moved (in the direction illustrated by the arrow F in FIG. 2 for the pedal module 10B) toward the front or rear, during the actuation of the corresponding pedal 8B by a foot (not illustrated) of a pilot, as illustrated by an arrow B, for a steering instruction.

The movement of the pedal module 10B in the direction of the arrow F (FIG. 2) in one direction or the other, enables, in accordance with the movement direction, a partial rotation of the arm 21 (illustrated by a double-headed arrow a in FIG. 4) between two end positions 21A and 21B.

The arm 21 thus transmits, via this partial rotation, the steering instruction movement generated by the actuation of the pedal by the pilot. A sensor or mechanical device converts, in conventional manner, the mechanical control which is representative of the rotation of the arm 21, into an electric signal. This electric signal is then transmitted, in conventional manner, to a steering system (not illustrated) of the rudder unit 3 in order to control the steering of the aircraft AC (FIG. 1).

The connection system 24 further enables an easy and rapid extraction of the pedal module 10A, 10B from the central module 9 on which it is mounted in a removable manner.

This extraction operation may be necessary, in particular in order to replace a defective pedal module 10A, 10B. This operation may also be implemented to access internal components of the central module 9, such as a component 20 (FIG. 5), via, for example, access hatches (not illustrated) which are provided on the lateral faces 13 and 14.

This extraction operation, for example, of the pedal module 10B, from the position illustrated in FIG. 2, is carried out in a very simple and rapid manner, using the following steps: disassembly of the screw 22 which connects the push rod 23 of the pedal module 10B to the arm 21 of the central module 9; and extraction of the pedal module 10B in the direction of the arrow E3 (FIG. 2) by rolling it on the guide rails 15 of the central module 9 via the runners 17. The complete extraction is illustrated in FIG. 4.

Furthermore, each pedal module 10A, 10B comprises a carrier structure 25 on which the corresponding pedal 8A, 8B is mounted in a rotating manner. This carrier structure 25 ensures the rotational movability of the pedal 8A, 8B.

This carrier structure 25 is monobloc. Furthermore, it is hollow which in particular enables the mass thereof to be reduced.

Furthermore, each pedal module 10A, 10B is provided with a protection bellows 26 which is arranged between the pedal 8A, 8B and the carrier structure 25.

This protection bellows 26 is intended to protect sensitive elements of the pedal module 10A, 10B from any contamination.

Figures 6, 7:
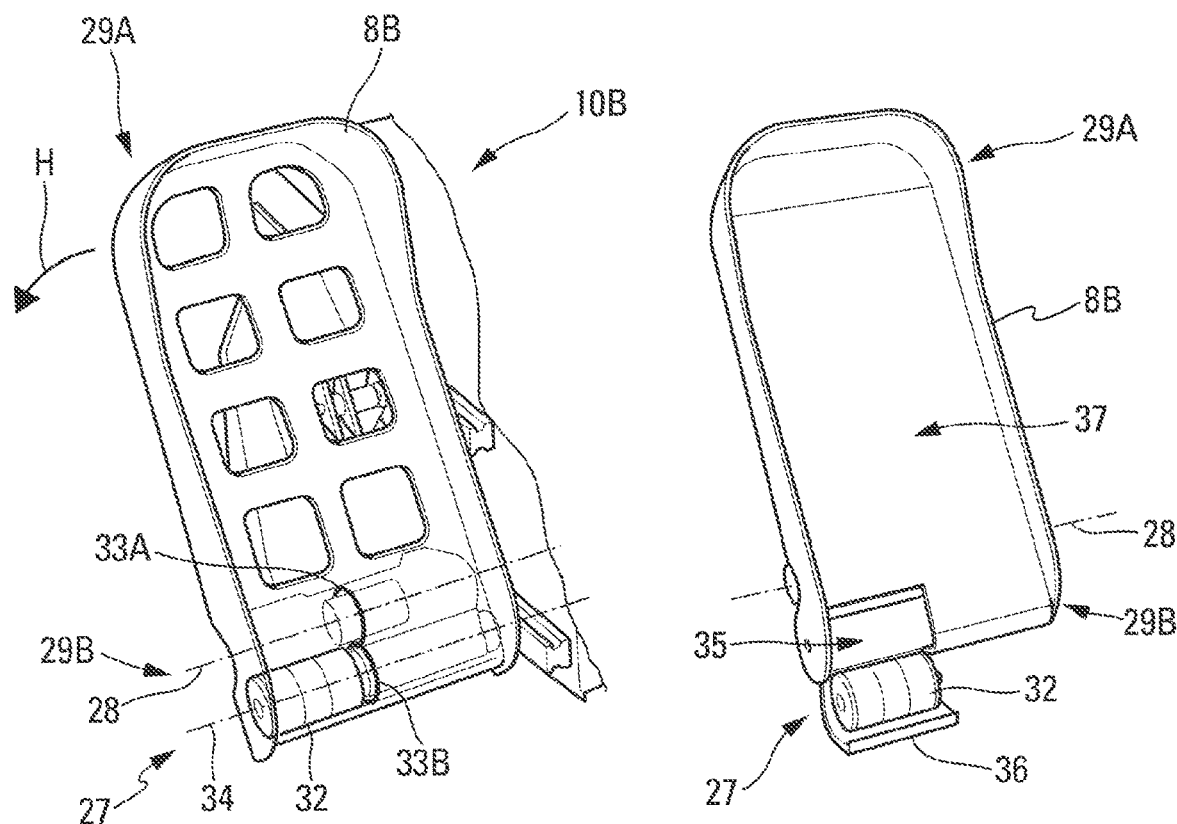
FIGS. 6 and 7 are perspective views showing a pedal provided with a braking system.

Furthermore, in a preferred embodiment, each pedal module 10A, 10B further comprises an integrated braking system 27, illustrated in FIGS. 6 and 7 for the pedal 8B. The braking system of the pedal 8A is identical to that described below of the pedal 8B.

For a braking instruction, the pedal 8B is mounted so as to be movable in terms of rotation about a rotation axis 28. This rotation axis 28 is located at the top in the direction of the floor (close to the lower end 29B of the pedal 8B). In this manner, when the pilot presses with his foot on the pedal 8B in the region of the upper end 29A thereof (arrow H), the pedal 8B pivots about the rotation axis 28 and generates an action on an associated actuator 30 (or functional connection rod) illustrated in FIG. 5. The braking system 27 also comprises a force detection spring 31 external to the actuator 30.

The braking system 27 further comprises a position sensor 32 (FIG. 6) which is configured to measure the rotation of the pedal 8B during the braking action.

The position sensor 32 is a multi-channel rotary sensor (inductive. Resistive, etc.) which is configured to determine the rotation of the pedal 8B (about the rotation axis 28) during the braking phase and to transmit it to adjustment systems (not illustrated) as a braking instruction.

To this end, the braking system 27 comprises a gearing 33A (illustrated schematically and transparently in FIG. 6) which is associated with the rotation axis 28 and which acts on a gearing 33B (also illustrated schematically and transparently in FIG. 6), generating a rotation about a rotation axis 34, measured by the position sensor 32.

Consequently, during the actuation of the pedal 8B in the direction illustrated by the arrow H, the pedal 8B rotates about the axis 28. This rotation transmitted via the cooperating gearing assembly 33A and 33B is measured by the position sensor 32.

In a preferred embodiment, the position sensor 32 is installed in a housing 35, illustrated in FIG. 7, which is provided in a lower portion of the pedal 8B (end 29B).

This position of the position sensor 32 at the lower portion of the pedal 8B enables rapid extraction of this component (via the rear) in the event of failure thereof.

Furthermore, in a specific embodiment, each pedal, such as the pedal 8B illustrated in FIG. 7, is provided with an access hatch 36. This access hatch 36 enables access to the housing 35. The access hatch 36 is arranged on a rear (support) face 37 of the pedal 8B which is intended to act as a support for a foot of a pilot with a view to actuation of the pedal 8B.

In this specific embodiment, the pedal module 10A, 10B preferably comprises an automatic extraction system (not illustrated). This automatic extraction system is configured to generate an automatic extraction of the position sensor 32 installed in the housing 25 in the event of the opening of the access hatch 36 of the housing 25, for example, via a conventional electrical connection which exists on a rack.

In this manner, as soon as the access hatch 36 is opened, the position sensor 32 is automatically extracted from its housing 35, as illustrated in FIG. 7. An operator then only has to grip it, for example, in order to replace it with a functioning sensor if it is defective.

Figure 8:
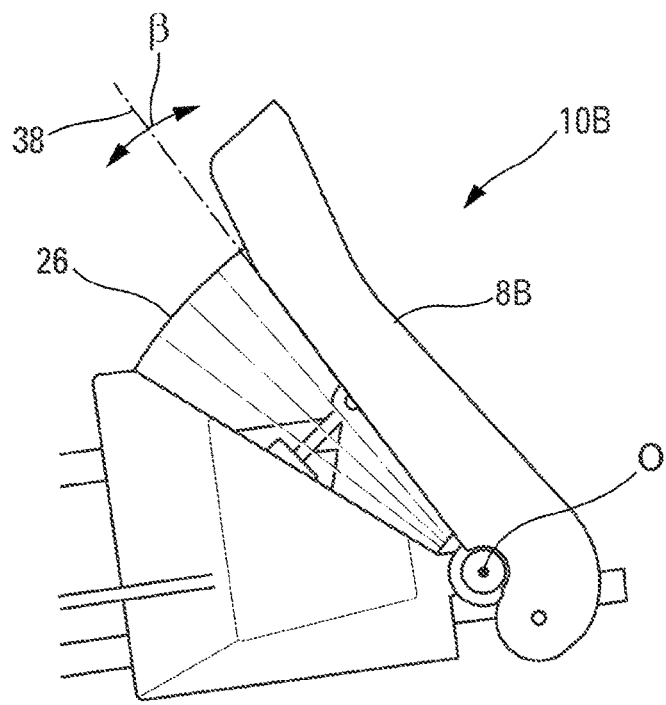
FIG. 8 is a lateral schematic view of a pedal module enabling a possible inclination of the associated pedal to be shown.

Furthermore, each pedal module 10A, 10B of the rudder bar 1 comprises an adjustment system 11, as illustrated in FIGS. 9 to 12. This adjustment system 11 is configured to enable the adjustment of an angle of inclination β of the corresponding pedal 8A, 8B relative to an inclination illustrated by an axis 38 in FIG. 8, about a point O.

To this end, the adjustment system 11 comprises a geared motor 39 which is capable of being controlled by an electronic control unit 52 (set out in detail below with reference to FIG. 9).

In a specific embodiment, illustrated in FIGS. 9 to 12, the adjustment system 11 comprises a screw 40 which is capable of being rotated by the geared motor 39 via an angled gearing 41. The screw 40 acts on a nut 42 which is configured to tilt a bellcrank 43 when the screw 40 is rotated. The bellcrank 43 is provided with a roller 44 which is arranged so as to be in contact with a roller track 45 (FIG. 13) formed on a front face 46 of the pedal 8B and to push the pedal 8B when the bellcrank 43 is tilted in order to modify the inclination thereof.

The adjustment system 11 also comprises return springs (not illustrated) which are intended to ensure permanent contact of the roller 44 on the roller track 45.

Figure 9:
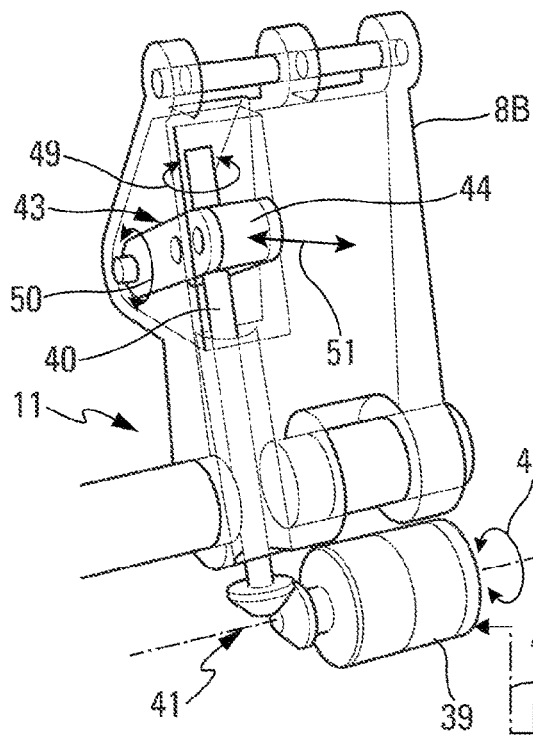
FIGS. 9 and 10 are perspective views which illustrate the main elements of an adjustment system, shown on a pedal which is partially illustrated.
Figure 10:
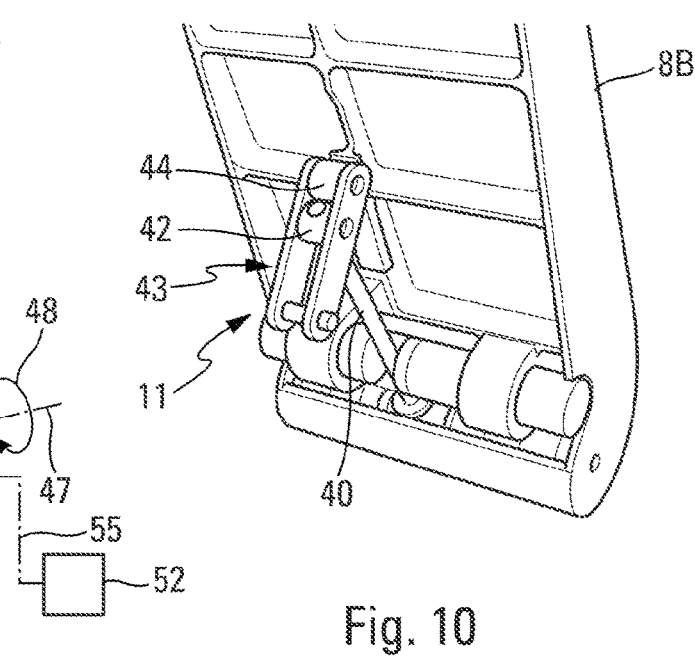
Figure 11:
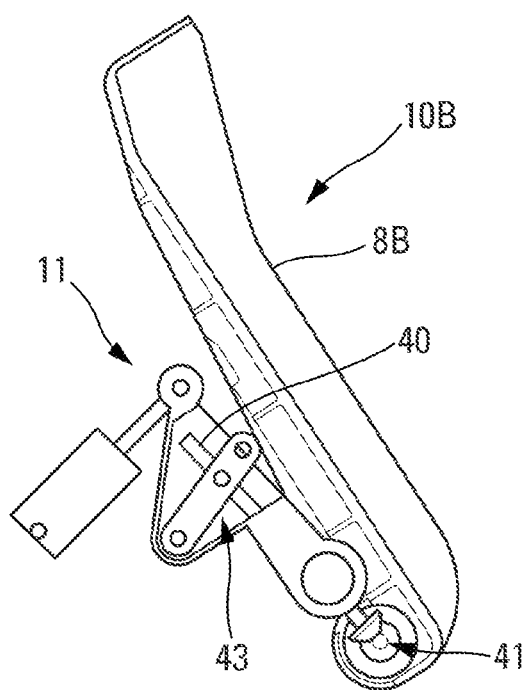
FIGS. 11 and 12 are lateral and perspective views, respectively, of a pedal provided with an adjustment system.
Figure 12:
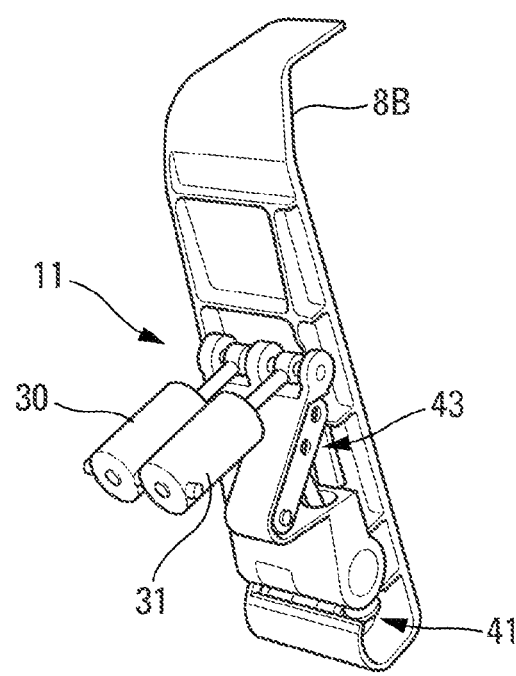

This adjustment system 11 is thus capable of implementing the following adjustment method: an electric adjustment instruction generated by an operator via the control unit 52 urges the geared motor 39 which rotates about an axis 47, as illustrated in FIG. 9 and as illustrated by a double-headed arrow 48; the geared motor 39 rotates the screw 40 via the angled gearing 41, as illustrated by a double-headed arrow 49; the screw 40 being blocked at the lower portion, the rotation thereof enables the movement of the nut 42, which has the effect of tilting the bellcrank 43, as illustrated by a double-headed arrow 50; during tilting, the free end of the bellcrank 43 describes a circular arc, and moves the roller 44 relative to the pedal 8B, as illustrated by a double-headed arrow 51; the roller 44 travels on the roller track 45 of the pedal 8B and pushes the pedal 8B, which creates a rotational movement of the pedal 8B about the rotation axis 28 thereof.

The adjustment system 11 is an independent and electric system which is controlled directly by the user of the rudder bar 1.

The adjustment system 11 thus enables a neutral inclination of the associated pedal to be modified. The neutral inclination of a pedal is the inclination of the pedal when the pilot is not pressing on it. This adjustment system 11 thus enables the inclination to be adapted to the size of the pilot who will have to use it.

In future cockpit architectures, it is envisaged to use touch screens on the instrument panels, and a working ergonomy on these screens, in accordance with the morphology of the pilots (mainly the length of the arms). Up to the present time, pilots were positioned, regardless of their size, at a precise location of the cockpit. In future, it is predicted that pilots will be positioned in accordance with their size (at a given distance from the screens, in order to ensure good working ergonomy) and their eye will be positioned along a well-determined line. The consequence of this development is that, between a tall pilot and a small pilot, the distance between the positioning of their feet is reduced by half, relative to the usual positioning. Consequently, the conventional rudder bars are not compatible with this method of positioning pilots since they do not ensure the optimum angle of positioning of the pedals relative to the feet of the user in accordance with their size. This effect is amplified by the fact that the new generation of pilot has a size difference which is even greater than the current generation. The adjustment system 11, as described above, enables this disadvantage to be overcome.

The variation supplement of the angle of inclination β of the pedal 8A, 8B obtained by the adjustment system 11 is, by way of illustration, in the order of 10° (+/−5°). This value may be greater, if necessary.

The main advantages obtained are: better comfort as a result of the greater angle variation of the pedals 8A, 8B; and the possibility of a differentiated adjustment, if desired, between the left pedal 10B and the right pedal 10A of the rudder bar 1.

Furthermore, as a result of the motorization (geared motor 39) of the adjustment system 11, preferably via an electrical adjustment, the pilot does not have to manually carry out the adjustment of the position of the pedals. This enables his/her workload to be reduced and increases his/her comfort in the context of his/her relationship with the piloting station when carrying out his/her job.

The adjustment system 11 is provided with the control unit 52 which is configured to control the controllable motorization (geared motor 39) of the adjustment system 11, as illustrated very schematically in FIG. 9 by a connection 55 with a dot-dash line. The control unit 52 activates the operation of the adjustment system 11 so that it generates a movement of the pedals 8A, 8B in one or other of the possible directions.

In a simplified embodiment, the control unit 52 comprises a control element which is capable of being activated by an operator. It may be a button or another mechanical member. The control element may also be a remote control unit which enables the adjustment system 11 to be controlled remotely, for example, when the pilot is seated on his/her seat in an appropriate position relating in particular to his/her field of vision.

Furthermore, in a variant or in addition, the control unit 52 may comprise an automated adjustment system which comprises a memory, this memory containing a list of predetermined positions of the pedals. The automated adjustment system is configured to be able to automatically move the pedals into one of the predetermined positions of the list which has been selected. This selection may be produced by the pilot via a rotating button or any other selection means, or via a remote control unit. In an advantageous variant, the control unit further comprises a pilot recognition system which is configured to recognize at least one specific pilot. In this instance, the automated adjustment system is configured to move the pedals into a predetermined position associated with the pilot thus identified by the pilot recognition system.

Figure 13:
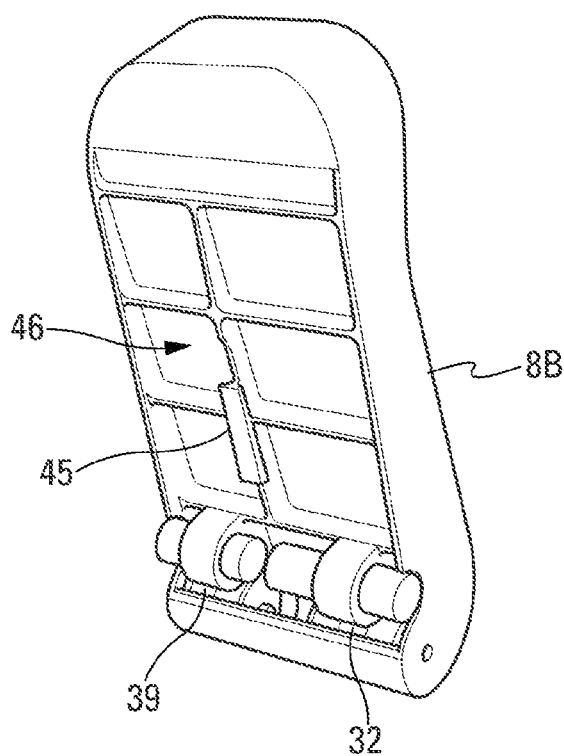
FIGS. 13 and 14 are perspective views, facing the rear and front, respectively, showing a pedal provided with both a braking system and an adjustment system.
Figure 14:
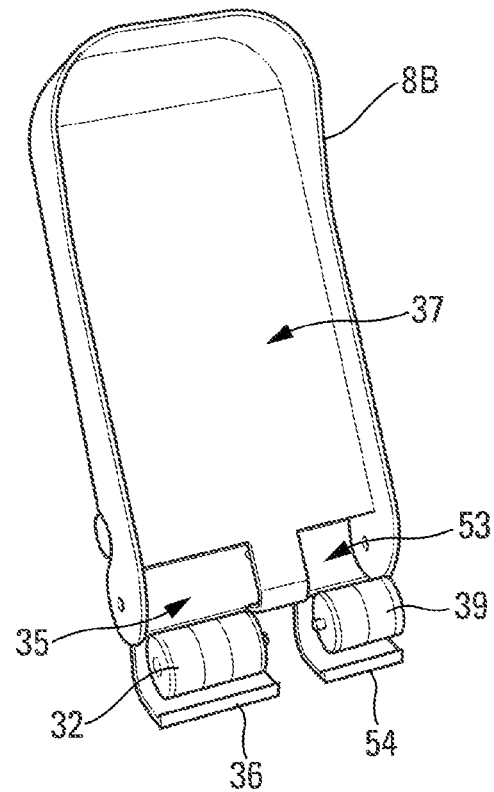

In a preferred embodiment, the geared motor 39 of the adjustment system 11 is installed in a housing 53, as illustrated in FIG. 14, which is provided in the lower portion of the pedal 8B. In the embodiment of FIGS. 13 and 14, the position sensor 32 and the geared motor 39 are installed in two adjacent housings 35 and 53.

This position of the geared motor 39 at the lower portion of the pedal 8B enables rapid extraction of this component (via the rear) in the event of failure thereof.

Furthermore, in a specific embodiment, each pedal, in the same manner as the pedal 8B illustrated in FIG. 14, is provided with an access hatch 54. This access hatch 54 affords access to the housing 53. The access hatch 54 is arranged on the rear (support) face 37 of the pedal 8B which is intended to act as a support for a foot of a pilot with a view to actuation of the pedal 8B.

In this specific embodiment, the pedal module 10A, 10B preferably comprises an automatic extraction system (not illustrated). This automatic extraction system is configured to generate an automatic extraction of the geared motor 39 installed in the housing 53 in the event of the opening of the access hatch 54 of the housing 53, for example, via a conventional electrical connection which exists on a rack.

In this manner, as soon as the access hatch 54 is opened, the geared motor 39 is extracted from its housing 53, as illustrated in FIG. 14. An operator then only has to grip it, for example, in order to replace it with a functioning geared motor if it is defective.

The pedal module 10A, 10B, as described above, has in particular the following features: a mobility of the pedal module assembly 10A, 10B which is ensured by the recirculating ball bearing tracks 17 which cooperate with (short rectilinear) guide rails 15 which are mounted directly on the central module 9; a very rapid disassembly of the pedal module assembly 10A, 10B for maintenance operations, in particular; an integration in the pedal module 10A, 10B of all of the braking functions; a monobloc carrier structure 25; a protection of the sensitive elements by the protection bellows 26 (integral) anti-contamination agents; and a possibility of rapid extraction of components, requiring rapid capacity for maintenance (position sensor 32, geared motor 39).

The pedal module 10A, 10B and the rudder bar 1, as described above, thus have numerous advantages. In particular: they are compact; they are simple; they are light; they can be easily maintained in an optimized manner in accordance with the nature of the components; they are robust; and they have reduced costs.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A monobloc pedal module for an aircraft rudder bar, the monobloc pedal module being configured to be connected to a central module of a rudder bar, the monobloc pedal module comprising:
a single pedal;
at least one integrated adjustment system configured to enable the adjustment of an angle of inclination of the pedal; and
a connection device which enables a removable connection of the pedal module to be produced.

2. The pedal module as claimed in claim 1, further comprising an integrated braking system.

3. The pedal module as claimed in claim 2, wherein the braking system comprises a position sensor which is configured to measure a rotation of the pedal during a braking action.

4. The pedal module as claimed in claim 3, wherein the position sensor is installed in a first housing which is arranged in a lower portion of the pedal.

5. The pedal module as claimed in claim 1, wherein the adjustment system is capable of being controlled.

6. The pedal module as claimed in claim 5, wherein the adjustment system comprises a geared motor which is capable of being controlled.

7. The pedal module as claimed in claim 6, wherein the adjustment system comprises a screw which is capable of being rotated by the geared motor, the screw acting on a nut which is configured to tilt a bell crank during the rotation of the screw, the bell crank being provided with a roller which is arranged so as to be in contact with a roller track which is formed on the pedal and to push the pedal when the bell crank is tilted in order to modify the inclination thereof.

8. The pedal module as claimed in claim 6, wherein the geared motor is installed in a second housing which is arranged in a lower portion of the pedal.

9. The pedal module as claimed in claim 4, wherein the pedal is provided with at least one access hatch which affords access to at least one of the first and second housings, the access hatch being arranged on a support face of the pedal.

10. The pedal module as claimed in claim 9, further comprising at least one automatic extraction system which is configured to automatically extract an element which is installed in the housing in the event of the opening of the access hatch of the housing.

11. The pedal module as claimed in claim 1, further comprising a hollow monobloc carrier structure on which the pedal is rotatably mounted.

12. The pedal module as claimed in claim 11, further comprising a protection bellows which is arranged between the pedal and the carrier structure.

13. A rudder bar for an aircraft, the rudder bar comprising at least one pedal module as claimed in claim 1.

14. The rudder bar as claimed in claim 13, further comprising at least one central module and two pedal modules, the pedal modules being arranged at one side and the other of the central module, each of the pedal modules being arranged on an associated lateral face of the central module.

15. The rudder bar as claimed in claim 14, wherein the central module is provided on each of the lateral faces with guide rails which are configured to cooperate with recirculating ball bearing tracks which are fixed to the associated pedal module and which form part of the connection device.

16. The rudder bar as claimed in claim 14, wherein the central module is provided on each of the lateral faces with an arm, each of the arms being connected in an articulated manner to a push rod of the corresponding pedal module, the arm and the push rod being configured to ensure the transmission of a movement of the pedal of the pedal module.

17. An aircraft comprising a rudder bar as claimed in claim 13.

* * * * *